United States Patent
Huat

(10) Patent No.: US 7,379,976 B2
(45) Date of Patent: May 27, 2008

(54) METHOD AND APPARATUS FOR DISPLAYING INTERMEDIATE CONTENT MESSAGES IN THE UNUSED PORTION OF A WEB BROWSER DISPLAY SPACE

(75) Inventor: Khoo Soon Huat, Alameda, CA (US)

(73) Assignee: Wireless 3G, Alameda, CA (US)

( * ) Notice: Subject to any disclaimer, the term of this patent is extended or adjusted under 35 U.S.C. 154(b) by 100 days.

(21) Appl. No.: 11/180,363

(22) Filed: Jul. 13, 2005

(65) Prior Publication Data
US 2006/0031419 A1    Feb. 9, 2006

Related U.S. Application Data

(63) Continuation of application No. 09/808,815, filed on Mar. 14, 2001, now Pat. No. 6,934,743.

(51) Int. Cl.
*G06F 17/30* (2006.01)
*G06F 17/00* (2006.01)
*G06F 3/00* (2006.01)
*G06F 15/173* (2006.01)

(52) U.S. Cl. .................. 709/218; 709/217; 715/764
(58) Field of Classification Search .......... 709/218, 709/217; 705/14; 345/788, 790, 800; 715/764
See application file for complete search history.

(56) References Cited

U.S. PATENT DOCUMENTS

| | | | |
|---|---|---|---|
| 5,390,295 A | * | 2/1995 | Bates et al. ............... 715/789 |
| 6,084,591 A | * | 7/2000 | Aleksic .................... 345/422 |
| 6,311,185 B1 | * | 10/2001 | Markowitz et al. ........ 707/10 |

\* cited by examiner

*Primary Examiner*—Jeffrey Pwu
*Assistant Examiner*—Scott M Sciacca
(74) *Attorney, Agent, or Firm*—Courtney Staniford & Gregory LLP

(57) ABSTRACT

A system for displaying intermediate message content over the unused area of a web browser is described. An intermediate message display process is linked to the web browser program executed on a client computer. The process monitors user activity on the client computer and identifies areas of the web browser display area that are not used. Upon detection of an unused clear space within the web browser display area, an intermediate message is displayed in the clear area of the web browser. The intermediate message could be an advertisement display provided by a third party content provider. A timer process and clear space detection routine within the intermediate message display process govern the display of the intermediate message in accordance with specified background pattern and message window dimension parameters.

1 Claim, 5 Drawing Sheets

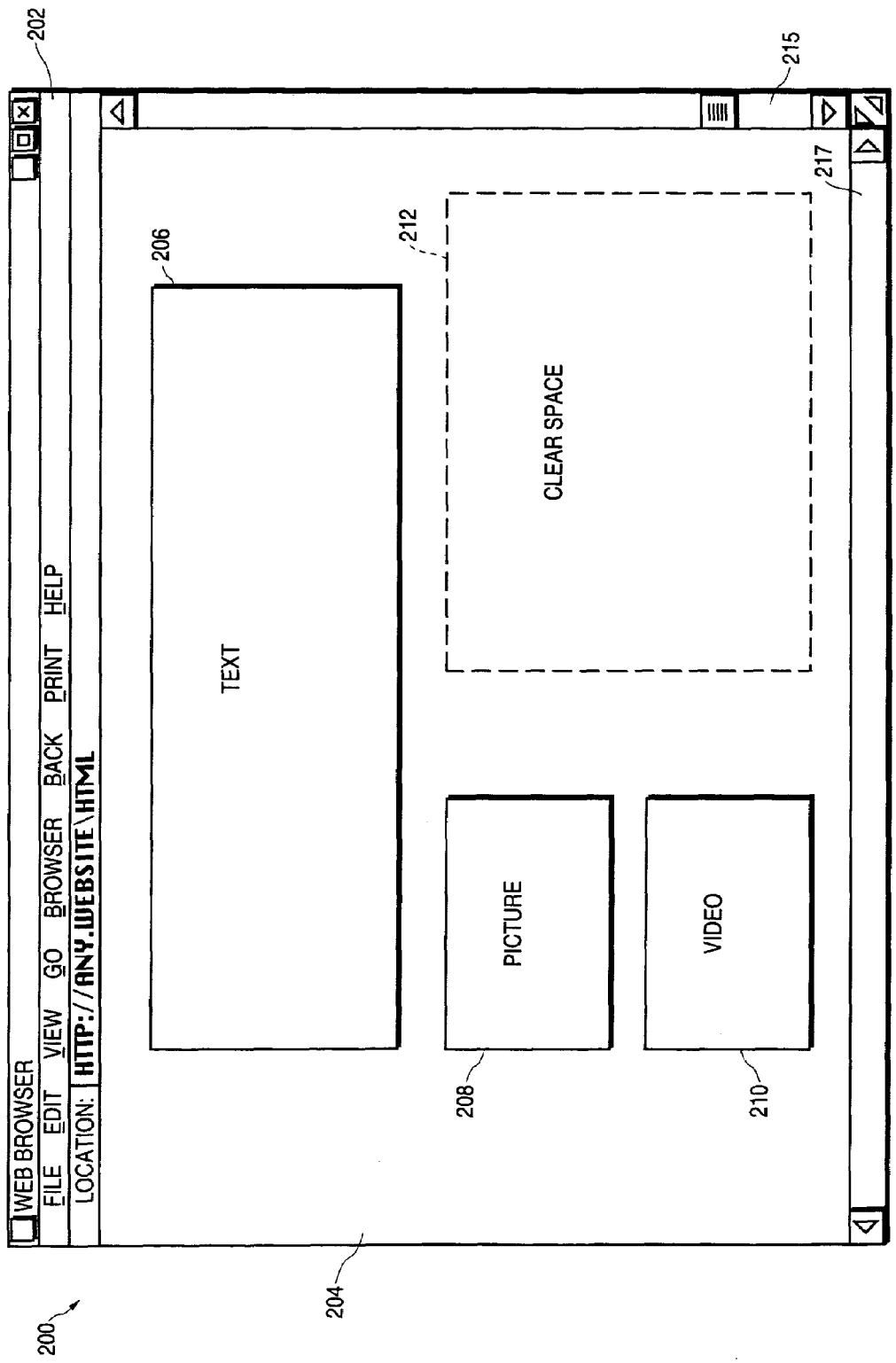

METHOD AND APPARATUS FOR DISPLAYING INTERMEDIATE CONTENT MESSAGES IN THE UNUSED PORTION OF A WEB BROWSER DISPLAY SPACE

CROSS-REFERENCE TO RELATED APPLICATIONS

The present application is a Continuation application of currently pending patent application Ser. No. 09/808,815, filed on Mar. 14, 2001 now U.S. Pat. No. 6,934,743 and entitled Displaying Advertising Messages in the Unused Portion of a Web Browser Display Space, which is assigned to the assignees of the present application.

FIELD OF THE INVENTION

The present invention relates generally to World-Wide Web based computer networks, and more specifically, to a system for displaying intermediate message content data in the unused portion of a web browser display space.

BACKGROUND OF INVENTION

Accessing information over the World-Wide Web ("web") portion of the Internet is a popular activity for many computer users. Data transmitted over the Internet is often provided in the form of web pages that are served by a web server process running on a server computer and accessed by a web browser process running on a client computer. Present web-based technologies allow web servers to integrate and provide a great deal of information in their web pages. Moreover, many different types of content can also be provided within a web page. For example, a particular web page may have static text or graphic information in one display area, links to other web pages in a second display area, and streaming audio or video in yet another display area.

Accessing the Internet and its services through a client computer is typically accomplished by invoking a network application program, such as a web browser. The network application program acts as an interface between the user and the Internet. Network application programs are typically client applications that accept commands from the user and obtain data and services from the Internet by sending requests to server applications, such as web servers on other computers at other locations on the Internet.

The web browser application programs are used for retrieving and viewing information from the Internet. Some examples of commercially available web browsers include Internet Explorer™ by Microsoft® Corporation of Redmond, Washington and Netscape Navigator™ by Netscape Communications® of Mountain View, Calif.

The web browser typically has a graphic user interface (GUI) that allows a user to control the web browser functions through a mouse and keyboard by pointing and clicking various control buttons that access and invoke various commands. The control buttons are typically provided in a dedicated area of the web browser, usually referred to as the "taskbar" or "toolbar" of the web browser. By using the cursor to operate the functional buttons or pull down menus of the web browser taskbar the user is able to control the displayed information from computers on the Internet. The taskbar also usually contains an area into which the user can type in an address called a URL ("Uniform Resource Locator") to obtain a desired HTML document or view a particular web page.

Web pages accessed through a web browser may be found on several other remote Internet host computers. When the user selects an HTML document link, the web browser can retrieve the document or data that the link refers to by using HTTP, FTP, Gopher, or other Internet application protocols. Once the desired HTML document or new web page is downloaded, its contents are displayed in the main display area of the web browser. The web page may include content in various different forms, such as text, graphics, video clips, audio clips, and the like. The web page may also include embedded links that allow the user to access other data or web pages.

Because of the amount of information that is typically provided in average web pages, display space is at a premium. Often, web pages contain information that is additional to the content that comprises the downloaded web page. One example of such intermediate information is an advertising message. In present web based systems, such advertising messages are frequently provided in the form of "pop-up" banner ads that occupy or cover a portion of the web display area. This often results in a crowded web display area in which the displayed intermediate content displaces some of the content that the user is primarily interested in. Moreover, many current pop-up message systems cause a pop-up message to appear in a window that covers or interferes with a portion of the active window that the user is viewing. This can be annoying since it interrupts the user's viewing experience and forces the user to close the pop-up message window or send it to the background.

In many cases, while the user is viewing the content of the web page or clicking on embedded links, certain areas of the browser window are typically unused. In some web browser programs, these unused areas, also referred to as "clear space" can constitute a significant percentage (e.g., 25%) of the total web browser display area. A disadvantage of present web browser systems is that this unused clear space is under-utilized for the display of intermediate content data. Instead, current systems randomly place pop-up message windows within the active viewing area, thus potentially covering content that the user desires to view.

Besides web browsing systems for personal computers, other types of display devices, such as televisions, portable computing or game devices, cellular phones, and the like also typically involve the display of primary content that may not occupy the entire viewing area. For these device systems, an unused portion of clear space may also be available for utilization by parties that are configured to communicate with these systems.

SUMMARY AND OBJECTS OF THE INVENTION

It is an object of embodiments of the present invention to provide a web-based content delivery system that displays intermediate message data over the unused portions of web browser display screen.

It is a further object of embodiments of the present invention to provide an improved Internet advertising message delivery system.

A system for displaying intermediate message content over the unused area of a web browser is described. An intermediate message display process is linked to the web browser program executed on a client computer. The process monitors user activity on the client computer and identifies areas of the web browser display area that are not used. Upon detection of an unused clear space within the web browser display area, an intermediate message is displayed in the clear area of the web browser. The intermediate message could be an advertisement display provided by a third party content provider. A timer process and clear space detection routine within the intermediate message display process govern the display of the intermediate message in accordance with specified background pattern and message window dimension parameters.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which:

FIG. 2 illustrates the display screen of an exemplary web page as displayed in a client computer that includes various display fields as well as clear space that is recognized by the clear space display process, according to one embodiment of the present invention;

DETAIL DESCRIPTION OF INVENTION

A system for displaying intermediate content in the unused or clear space of a web browser display is described. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Hardware Overview

Aspects of the present invention may be implemented on one or more computers executing software instructions. According to one embodiment of the present invention, server and client computer systems transmit and receive data over a computer network or standard telephone line. The steps of accessing, downloading, and manipulating the data, as well as other aspects of the present invention are implemented by central processing units (CPU) in the server and client computers executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to embodiments of the present invention.

The instructions may be loaded into the memory of the server or client computers from a storage device or from one or more other computer systems over a network connection. For example, a client computer may transmit a sequence of instructions to the server computer in response to a message transmitted to the client over a network by the server. As the server receives the instructions over the network connection, it stores the instructions in memory. The server may store the instructions for later execution, or it may execute the instructions as they arrive over the network connection. In some cases, the downloaded instructions may be directly supported by the CPU. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the server or client computers.

Figure 1:
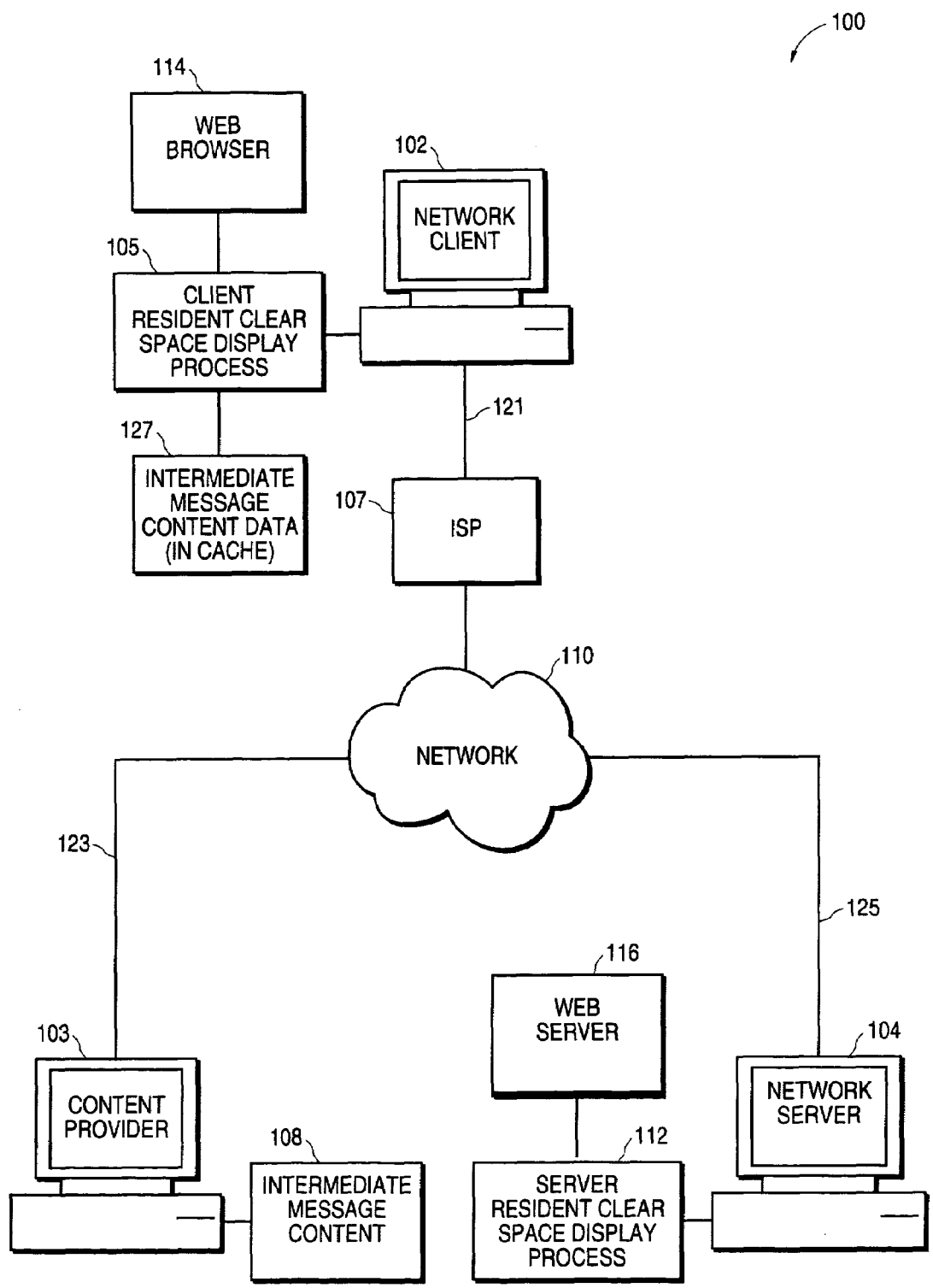
FIG. 1 illustrates a block diagram of a computer network system that implements embodiments of the present invention.

FIG. 1 illustrates a computer network system 100 that implements one or more embodiments of the present invention. In system 100, a network server computer 104 is coupled, directly or indirectly, over line 125 to one or more network client computers 102 through a network 110. The network interface between server computer 104 and client computer 102 may also include one or more routers that serve to buffer and route the data transmitted between the server and client computers over line 121. Network 110 may be the Internet, a Wide Area Network (WAN), a Local Area Network (LAN), or any combination thereof.

In one embodiment of the present invention, the server computer 104 is a World-Wide Web (WWW) server that stores data in the form of 'web pages' and transmits these pages as Hypertext Markup Language (HTML) files over the Internet network 110 to the client computer 102. For this embodiment, the client computer 102 typically runs a "web browser" program 114 to access the web pages served by server computer 104 and content provider 103.

In one embodiment of the present invention, server 104 in network system 100 is a server that executes a server side intermediate message display process 112. Client versions of the intermediate message display process 105 may also be executed on the client computers, such as client computer 102. The intermediate message display process 112 may represent one or more executable program modules that are stored within network server 104 and executed locally within the server. Alternatively, however, it may be stored on a remote storage or processing device coupled to server 104 or network 110 and accessed by server 104 to be locally executed. In a further alternative embodiment of the present invention, intermediate message display process 112 may be implemented in a plurality of different program modules, each of which may be executed by two or more distributed server computers coupled to each other, or to network 110 separately.

In one embodiment of the present invention, wherein network 110 is the Internet, network server 104 executes a web server process 116 to provide HTML documents, typically in the form of web pages, to client computers coupled to network 110. To access the HTML files provided by server 104, client computer 102 runs a web client process (typically a web browser, such as Netscape Navigator™ or Microsoft Explorer™) 114 that accesses web pages available on server 104 and other Internet server sites, such as content provider 103 (which may also be a network server executing a web server process). It should be noted that a network system 100 that implements embodiments of the present invention may include a larger number of interconnected client and server computers than shown in FIG. 1. For this embodiment, the client computer 102 may access the Internet network 110 through an Internet Service Provider (ISP) 107. In one embodiment of the present invention, a separate content provider 103 may provide the data that comprises the intermediate messages 108. Alternatively, this content may be provided directly by the server computer 104.

As can be appreciated by those of ordinary skill in the art, the representative networked computers of FIG. 1, such as network server computer 104 can be implemented as any standard computer that includes a central processing unit (CPU) coupled through a bus to various other devices. These devices could include random access memory (RAM), a read only memory (ROM), and mass storage devices (e.g., a magnetic disk, optical compact disk, or tape drive for storing data and instructions). The computer also typically includes input/output devices, such as, a display device, keyboard, and network interface device, along with other similar devices or interfaces. Any of the computers in FIG. 1 could be implemented in the form of personal computers, laptop computers, mainframe computers, or other type of workstation computers. The computers in FIG. 1 could also be implemented in the form of portable or miniaturized computing devices, such as handheld personal digital assistants (PDA), including devices that communicate with other devices on the network over a wireless medium. In certain systems, the client computer can also be implemented as a dedicated Internet client, such as a television that includes Internet access. Such clients are typified by the WebTV™ system.

Clear Space Intermediate Message Display Process

In one embodiment of the present invention, network system 100 comprises a client resident clear space display process 105 executed by network client 105. The client side clear space display process 105 is operable to display an intermediate message content in the unused or clear areas of web browser 114 displayed on the client 102. The intermediate message content can comprise text or graphic messages, such as pop-up advertisements or other similar messages. These messages can be stored or cached locally on the network client 102 such as through an intermediate message content data storage location 127, or the intermediate message content can be transmitted to the network client 102 over the network 110 from a content provider 103. In this case, the actual data comprising the intermediate message can be stored in a data storage device 108 coupled to the content provider computer 103. For this embodiment, the content provider 103 acts as a repository of intermediate messages for upload to the network client 102.

In one embodiment, the client resident clear space display process 105 is transmitted to the network client 102 by network server 104 from a server resident clear space display process 112. Once the clear space display process is downloaded to the client computer, it is stored locally and executed in conjunction with the client web browser program 114. For this embodiment, the clear space display process is only downloaded once to the client computer from the server computer, and is thereafter executed locally. In an alternative embodiment, the clear space display process executed over the network by the network client 102 from network server 104 as a server resident clear space display process 112 whenever the client web browser program 114 is executed. This method may slow execution time of the clear space display process since the program is executed over a network rather than locally, but requires less storage space on the network client 102.

The clear space display processes 105 serves to generate and display intermediate messages, such as pop-up advertisements, in the unused areas of web browser 114. When a user is viewing a downloaded web page, much of the web page display area may be unoccupied. The clear space display process includes a process that identifies empty spaces within the displayable portions of the client computer display device. For the embodiment in which the client computer executes a web browser program 114, the clear space display process 105 recognizes empty spaces within the web page displayed by the web browser. The clear spaces identified by the clear space display process conform to dimensions that correspond to the size of the message to be displayed.

FIG. 2 illustrates a web page that includes various display fields as well as clear space that is recognized by the clear space display process. Taskbar 202 contains various command or command icons for navigating around web sites and performing various functions. The taskbar 202 can also include an area that displays the URL (address) of the displayed web page. The main section of web page 200 is display area 204. This area displays the contents of the web page at the specified URL. For the example illustrated in FIG. 2, web page 200 includes a text area 206 that contains lines of text. The exemplary web page 200 also includes a window 208 for displaying graphical content, such as still pictures or banner advertisements. Depending on the content contained in a web page, many types of content and formats are possible. For example, another window 210 may be used to display streaming video content through the web page. A typical web browser program also includes a vertical scroll bar 215 and horizontal scroll bar 217 that allow the user to scroll the displayed web page up/down or left/right to view other areas of the web page.

Many web pages include some amount of empty or clear space. This is unused space within the web page that is not being used to display purposive content such as text 206, graphics 208 or any other type of actual content. Typically, such clear space may not be totally devoid of content in that it may contain color or a background pattern or even a screen saver graphic. Technically though, even if such a clear space is not displayed as a plain white area, this space can be considered unused by the web page being accessed.

In one embodiment of the present invention, the clear space display process identifies and measures the available clear space within a displayed web page. The empty space 212 is defined by XY coordinates of a boundary that encloses the unused empty space. The XY coordinates of the boundary define both the size of the empty space and its location within the active display area of the web page. In the simplest embodiment, the empty space is defined as a rectangular or square space that includes a usable area of the available unused space in a web page. For this type of boundary, the XY coordinates comprise the corner points of the boundary in terms of pixel locations. In other embodiments, the empty space can be defined by other two-dimensional shapes, such as circles, triangles, or compound polygons. For these embodiments, the coordinates of the boundary encompassing the clear space can be defined in terms of pixel locations or area and location formulae appropriate for the outline shape of the boundary.

Generation and Display of Intermediate Messages

Figure 4:
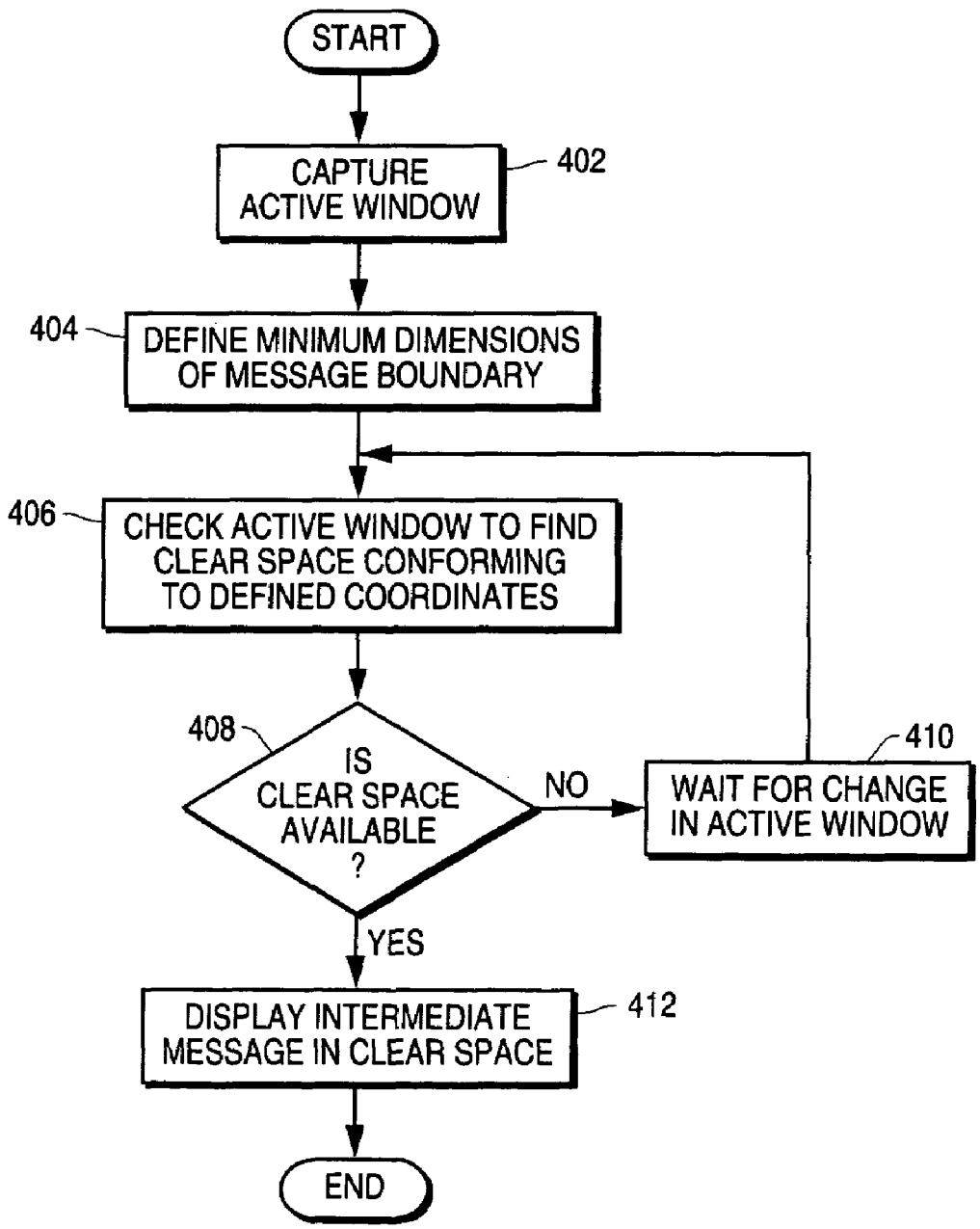
FIG. 4 is a flowchart that illustrates the process of identifying and displaying intermediate messages in the clear space of a displayed web page, according to one embodiment of the present invention.

FIG. 4 is a flowchart that illustrates the process of identifying and displaying intermediate messages in the clear space of a displayed web page, according to one embodiment of the present invention. In step 402, the active window in which the intermediate display image is to be displayed is determined. In computer applications, a computer desktop can include various simultaneously open windows, such as a word processor program, e-mail program and web browser all running concurrently. Typically only one application can be active at one time, with the other applications displayed in the background of the active window. For this embodiment, it is assumed that the intermediate message is to be displayed in the clear space of a web browser program. In step 402, the displayed web page of an active web browser program is displayed.

In step 404, the minimum size of the required clear space is defined. The size of the clear space boundary is defined in terms of dimensions that specify the size, shape of boundary in which the intermediate message is to be displayed. In some cases, an active web page may include several regions of unconnected unused space. A minimum clear space area is defined, such that clear space that is not of a sufficient size is not flagged as an identified clear space. In one embodiment, if two or more disparate areas of clear space are of sufficient size, all such areas may be flagged and defined within the active window as being available for the display of intermediate messages.

In step 406 the active window is scanned to find clear areas that conform to the minimum dimensions defined in step 404. Clear space comprises space in the active window that does not contain purposive content; such clear space could comprise plain white background, a constant color background, or a repeated pattern background (such as a static screensaver pattern). In one embodiment of the present invention, an RGB color code is defined for the clear space. The clear space display process 105 scans the active window and looks for groups of pixels of the defined dimensions that conform to the defined clear space color code. If such a grouping is found, this area is defined as clear space within the active window. If the active area includes a background pattern that is not a constant color, but is instead a background pattern, the RGB color code is defined in terms of the background pattern. In this case, the background pattern must have a repetitive element, since a random pattern is difficult to define. In one embodiment, the clear space display process scans the active area for an appropriately sized clear space by moving from one column (or row) of pixels to the next column (or row). Alternatively, the clear space display process analyzes a set of pre-defined pixels within the active area. If one or more pixels within the first set of analyzed pixels conform to the defined pattern, neighboring pixels are analyzed to determine if an appropriate clear space exists.

In step 408 of FIG. 4, it is determined whether an adequate clear space area exists within the active window. If a clear space area exists, an intermediate message is displayed in this area, step 412. In one embodiment, the intermediate message is downloaded from the intermediate message content storage location 127 in the client computer 102. For example, the intermediate message could be stored in a local cache for display by the clear space display process 105 upon the identification of a clear space area in the active window. This intermediate message is then displayed in the foreground of the active window within the predefined boundary location. If the intermediate message is not stored or generated locally within the client computer 102, it may be downloaded over the network from a remote source, such as content provider 103 or web server 116.

If, in step 408, it is determined that clear space is not available within the active window, the clear space display process does not download and display the intermediate message. Instead, it waits for a change in the active window that may create the availability of clear space within the window, step 410. Such a change could be the reloading of another web page or the scrolling of a web page within the display area.

Figure 3A:
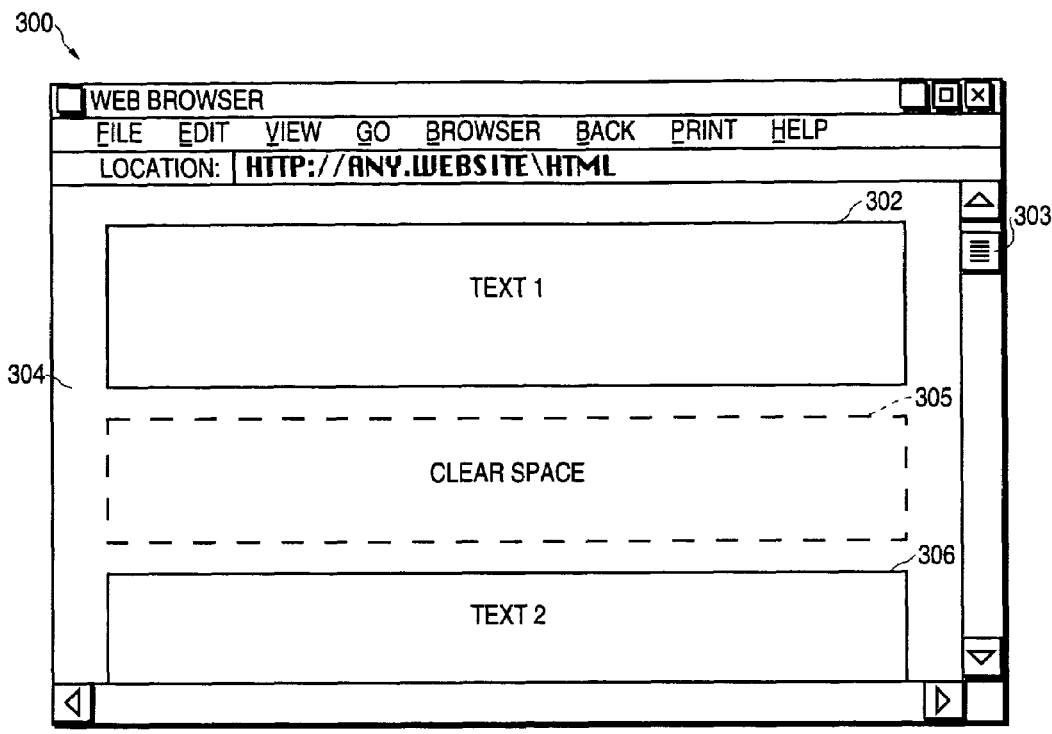
FIG. 3A illustrates an exemplary web page with a recognized clear space area in a first scrolled position, according to one embodiment of the present invention.
Figure 3B:
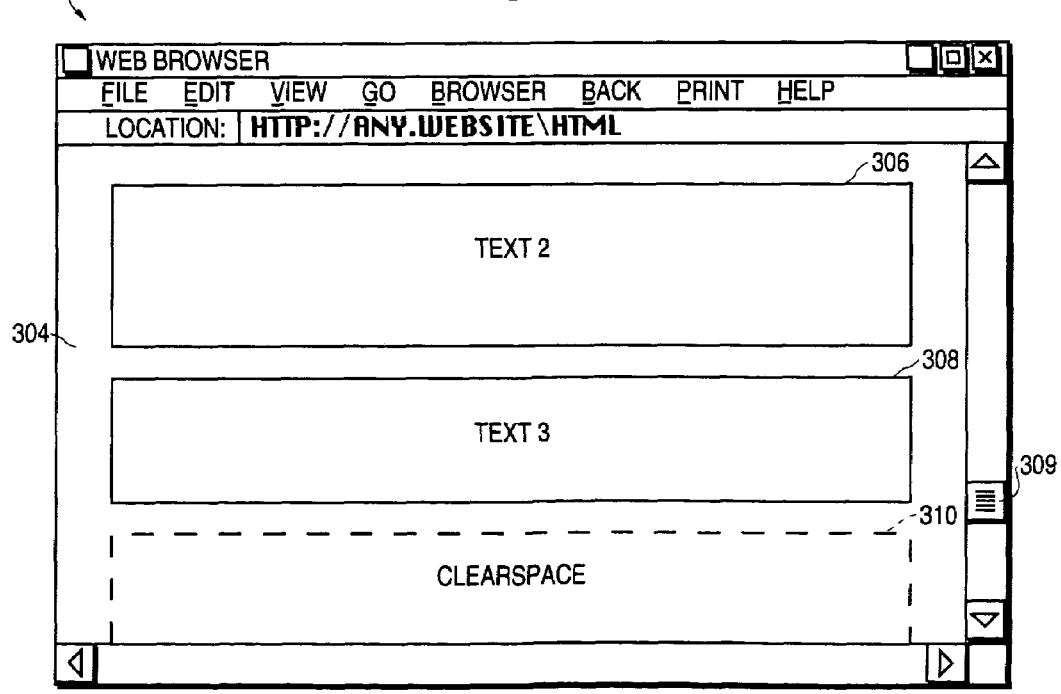
FIG. 3B illustrates the exemplary web page of Figure in a second scrolled position.

Some web pages may include content that cannot be displayed within the confines of a single display screen. These pages typically require that the user scroll through the web page to view the entire page. On most web browsers, this is accomplished using scroll bars 215 and 217. As a user scrolls up or down, or left or right through a web page, the contents of the web page shift in the display device. The empty space within the web page also shifts as the page is scrolled. FIGS. 3A and 3B illustrate the shifting of a web page display as the web page is scrolled from a first position to a second position. FIG. 3A illustrates an exemplary web page with a recognized clear space area in a first scrolled position. In web page 300 in FIG. 3A, the display area 304 corresponds to the page when the scroll bar is in a first position 303, and includes a first text display area 302 and a second text display area 306. An unused clear space 304 is available between these two text areas. FIG. 3B illustrates the exemplary web page of FIG. 3A in a second scrolled position, as indicated by the scroll bar in a lower position 305. For this display, the second text display area 306 has shifted up, and a new text area 308 has appeared. For this web page display, a new clear space 310 is available at the bottom of the page.

Figure 5:
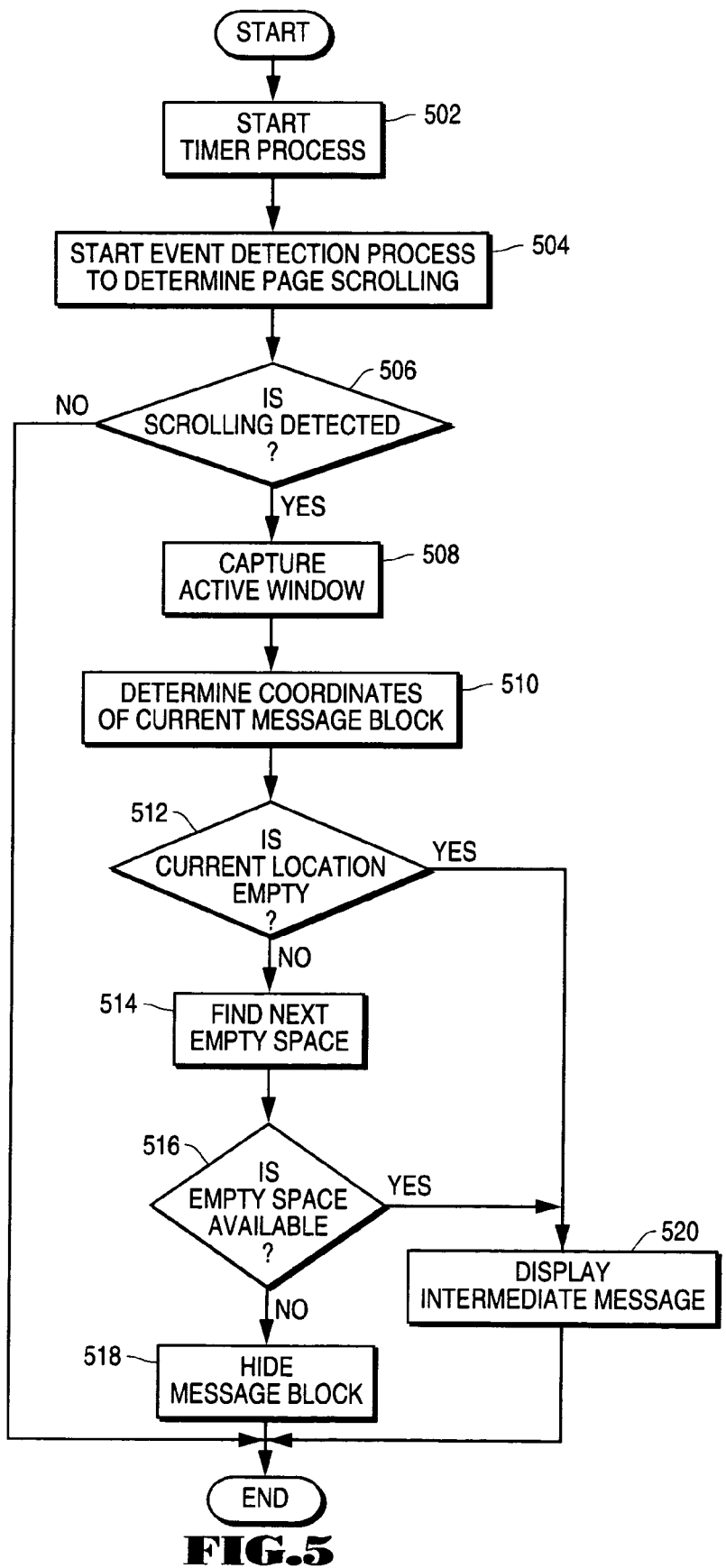
FIG. 5 is a flowchart that illustrates to process of displaying intermediate messages in the clear space of a scrolled web page, according to one embodiment of the present invention.

FIG. 5 is a flowchart that illustrates to process of displaying intermediate messages in the clear space of a scrolled web page, according to one embodiment of the present invention. In step 502 a timer process is started. The timer process periodically checks the active window to determine a change, and executes a find clear space process that scans the active window for clear spaces. In one embodiment, the active window is checked every two seconds to determine if an intermediate message can be displayed in a clear area. The timer period can be altered depending upon the requirements and configuration of the client computer system.

In step 504 an event detection process is started. This process captures the state of the active window and determines if a state change has occurred. For example, if the active window is an HTML web page, the event detection process determines if a new web page has been loaded, or an existing web page has been scrolled up or down, or left or right. In step 506 it is determined whether the displayed page has been scrolled or otherwise changed. In one embodiment, the process illustrated in FIG. 5 assumes that an intermediate message is either presently being displayed or that no clear space is available. For this embodiment, if in step 506, the displayed page is not scrolled, the process ends, with the intermediate message continuing to be displayed or hidden, depending on the current state. If, however, in step 506 it is determined that the page has been scrolled, the new active window is captured, step 508. In step 510, the coordinates of the currently defined message block are determined. The coordinates include the location of the message block on the page prior to the scroll operation, as well as the size and shape of the message block. It should be noted that this step assumes that an intermediate message was displayed in a clear space area in the page prior to the scroll operation.

In step 512, it is determined whether the same location and dimensions in the new active window is empty and clear. If the location is clear, an intermediate message is displayed in the clear space. This results in the intermediate message being displayed in the same relative location of the new scrolled page. If it is determined in step 512 that the current location is not empty, a new empty space within the new active window is located, step 514. In one embodiment, this is accomplished by comparing groups of pixels within the active window to predefined RGB color patterns, or other predefined pixel patterns, as described in relation to the process illustrated by step 406 in FIG. 4. In step 516 it is determined whether an appropriate empty space within the new active window is available. If not, the intermediate message is hidden, step 518, and the process either ends or repeats from step 504 upon initiation by the timer process started in step 502. If an appropriate empty space is available in the new active window, the intermediate message is displayed in step 520. As described in reference to FIG. 4, the intermediate message could comprise text, graphic, video or other content provided by the client computer locally, or downloaded over the network from a remote content provider or server.

For the process illustrated in FIG. 5, a currently displayed message is relocated in a newly active window if clear space in the same relative or different location is available. The dimensions of the message boundary size are maintained if the same size area is available in the new window. In an alternative embodiment, the message boundary size may change if a larger or smaller amount of contiguous clear space is available in the new window. For example, if smaller area of clear space is available, the message boundary size may be scaled down to fit in the smaller clear space. Similarly, if a larger area is available, the boundary size may be scaled up to fit in the larger clear space. Moreover, the shape of the message boundary area may be altered to fit different shape clear spaces that may be available.

Embodiments of the present invention are intended to be used with any type of web browser or web server that has a principal display area associated therewith. In addition, embodiments of the present system may be used with other types of display programs and display devices. For example, the display device may be a television, and the intermediate message display process may be configured to find clear space within a static display or dynamic program being viewed on the television.

In one embodiment of the present invention, the client intermediate message display process 105 works with the web browser 114 to determine when and where to display the intermediate message as illustrated in FIG. 2. A typical example of an intermediate message might be an advertising message generated and provided by a product or advertiser content provider during the period of time that the user is waiting for a new web page to load. Because the Internet allows relatively easy access to literally a worldwide marketplace, web sites have become increasingly used by commercial entities as virtual "storefront" sites. Indeed, retail Internet sites allow customers to make shopping decisions and perform entire purchase transactions on-line without visiting a store or speaking to a clerk. One significant development in electronic commerce ("e-commerce") sites is the integration of advertising messages with the server content. As in the magazine publishing industry, for example, such advertising is often used by the content provider to subsidize at least a portion of the cost of maintaining the web page and providing the products or data to the customer.

Because of the ability to reach so many potential customers, advertisers often utilize different techniques to present their message through Internet sites. Pop-up advertising messages, banner ads, hidden links, and Java applets that are all embedded within a content provider's web page are all examples of some of the techniques used by advertisers to get their messages to the users. Embodiments of the present invention allow advertisers to effectively increase their exposure for their products or services.

In general, the intermediate message displayed by the clear space display process is displayed over of the unused area of the active web browser window so that the unused background space is essentially hidden in whole or in part by the intermediate message. The intermediate message display can be displayed in an HTML frame or display area that can display text, graphics, streaming video, or other type of data. Moreover, this intermediate message display area may include standard GUI elements that allow the message display window to be resized or scrolled within.

As described above, the content of the message displayed in the intermediate message display window may be provided by the intermediate message content data 127 contained in local memory of the client (web browser) computer. This may be done by storing the intermediate message content data 127 in the client computer local memory, such as a cache memory, and uploading this data from the cache during web browser idle periods. For this embodiment, the intermediate message content data 127 may periodically be updated from the intermediate message content 108 provided by a content provider 103 or other computer, such as server 104. For systems in which the client computer 102 is a wireless device, such as a PDA, cellular phone, or similar device, the intermediate message content data can be provided on resident storage media, such as solid state disk, memory card, flash memory, or similar devices. Alternatively, the intermediate message content data 127 can be uploaded from a memory coupled to other computers on the network, such as content provider 103 or server 104. For this embodiment, the content data can be uploaded to the client computer off-line periodically from the server 104 or content provider 103. The number of different messages and the frequency of updating the messages can be determined by the server or content provider. For example a series of ads can be sequentially uploaded to the client computer according to a particular ad campaign schedule. This ensures that the displayed messages are timely and appropriate. Such upload operations typically occur during off-line periods when the modem or client network interface is idle, such as when the user is viewing a loaded web page. In this case, the client side clear space display process 105 and/or server side clear space display process 112 automatically upload any new message content to the client computer.

The clear space display process may also include a message monitoring function that monitors the number of times that a message has been viewed or the age of a message has been viewed or that is scheduled to be viewed. In this case, new message can be uploaded to replace messages that have been viewed a set number of times or that are otherwise stale. For example, if it is determined that a particular advertisement has been displayed on ten successive scrolled we pages, a new ad can be uploaded during the idle period of the web browser instance, so that the next time the taskbar is idle, a new ad is viewed. The upload mechanism may have an interrupt feature built-in so that if a context switch event occurs during the uploading process, the old advertisement is re-displayed. Besides pop up or banner ads, the intermediate message content displayed by the clear space display process could include other types of date. This includes, streaming data, hypertext links, stock quotes, graphic content, audio data links, or any data or information deemed useful in the course of using a computer, surfing the Web, watching television or using handheld devices, such as PDAs and cellular phones.

In the foregoing, a system has been described for generating and displaying intermediate messages in the unused area on a client web browser. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of displaying an intermediate message in a web browser executed in a web browser executed on a client computer, comprising the steps of:

detecting whether a user has scrolled a pre-loaded web page displayed in the web browser in either an up/down or left/light manner using scroll functions provided by the web browser;

identifying a new active display window within the scrolled area of the web browser if it is determined that the user has scrolled the pre-loaded web page;

defining size and dimensions of a previous message display window encompassing an intermediate message displayed in an unused display space within an active display window prior to the scrolling of the pre-loaded web page;

identifying an unused display space within the new active display window corresponding to the defined size and dimensions of the previous message display window;

displaying the intermediate message in a new message display window if unused display space corresponding to the defined size and dimensions of the previous message display window is available.

* * * * *